Patented July 6, 1954

2,683,173

UNITED STATES PATENT OFFICE 2,683,173

AMIDE PREPARATION

Cyrus A. Weisgerber, Wilmington, Del., assignor to Hercules Powder Company, Wilmington, Del., a corporation of Delaware No Drawing. Application December 11, 1948, Serial No. 64,898

4 Claims. (Cl. 260—561)

This invention relates, in general, to a hydrolyzing process and, in particular, to a process for hydrolyzing acrylonitrile to acrylamide.

In recent years acrylamide and its α-substituted homologs and the like have become a relatively valuable monomer for use in preparing synthetic polymers and, accordingly, it is advantageous to provide new and commercially feasible methods for the preparation of these compounds. Inasmuch as the presently available methods for their preparation have frequently involved either difficult procedures or the embodiments of relatively unavailable starting materials or, in numerous cases, may tend to produce the partially polymerized compound, it is highly desirable to provide a process for the preparation of monomeric acrylamide and its α-substituted homologs and derivatives, which process utilizes convenient chemical reactions applied to readily available chemical compounds.

Now in accordance with the present invention, acrylonitrile and its α-substituted homologs and the like are hydrolyzed to acrylamide and its derivatives in a controlled hydrolysis procedure with sulfuric acid monohydrate resulting in the formation of an acrylic amide sulfate. The acrylic amide resulting from this hydrolysis reaction is then preferably isolated in substantially monomeric form through a procedure of controlled neutralization to a slightly alkaline pH in the substantial absence of available water and the substantially monomeric amide is physically separated from salts of neutralization and is recovered therefrom.

According to one embodiment of the invention monomeric amide is isolated from the amide sulfate reaction mixture through neutralization with ammonia in the substantial absence of solvent and the amide is physically recovered therefrom, for example, by vacuum distillation.

According to another embodiment of the invention the substantially monomeric amide is isolated from the amide sulfate reaction mixture by neutralization of the sulfate by addition of solid sodium carbonate in the presence of water less than that amount necessary to form sodium sulfate decahydrate with the sodium sulfate resulting during the neutralization, whereupon the amide is physically recovered by solution in an appropriate organic solvent such as, for example, a water-miscible lower alcohol, ketone or the like and filtration to separate it from salts of neutralization.

According to a still further embodiment of the invention the substantially monomeric amide is isolated from the amide sulfate through half neutralization with gaseous ammonia in lower alcohol solution, and filtration to separate the soluble amide from the salts of neutralization, followed by evaporation of the solvent.

The general nature of the invention having been set forth, the following examples are given in illustration but not in limitation of specific procedures in the process of the invention.

*Example 1*

Sulfuric acid monohydrate was prepared by mixing 1072 parts by weight of 91.5% sulfuric acid and 97 parts by weight of water containing 0.5 part of $CuSO_4 \cdot 5H_2O$ to yield sulfuric acid monohydrate containing a slight excess of water. Five hundred thirty parts by weight of acrylonitrile was placed in a reaction vessel equipped with a reflux condenser and ⅙ of the sulfuric acid monohydrate was added rapidly to the acrylonitrile with stirring. The mixture was heated to about 65° C. and another ⅙ of the sulfuric acid monohydrate was added thereto. At this stage an exothermic reaction started to occur and the reaction vessel was cooled intermittently to maintain a temperature between about 65° and 70° C. As the temperature fell below about 65° C. another ⅙ of the sulfuric acid monohydrate was added rapidly to the reaction mixture again followed by intermittent cooling, this process being repeated until all the acid was added in this manner. After all the acid was added, heating was maintained for an additional hour at 70° C.

The reaction mixture resulting from this procedure was a clear, somewhat viscous liquid exhibiting a tendency to deposit crystals of acrylamide sulfate upon cooling below about 30° to 40° C. The reaction mixture comprising essentially a concentrated aqueous acrylamide sulfate composition may be neutralized and utilized directly for polymerization reaction, may be treated in aqueous medium; e. g.; with a lime suspension or the like for production of an aqueous solution of acrylamide, or may, if desired, be treated for isolation of substantially monomeric acrylamide sulfate or substantially monomeric acrylamide

*Example 2*

Into a reaction vessel fitted with an ammonia inlet tube, stirrer, and thermometer was placed 169.9 parts of substantially anhydrous acrylamide sulfate recovered by crystallization from the reaction mixture of Example 1. The acrylamide sulfate was melted by raising the temperature to about 60° C. and a slow stream of ammonia was passed over the surface of the molten acrylamide sulfate while the liquid was being constantly stirred. The flow of ammonia was regulated to maintain the temperature of the reaction mixture between about 70° and about 90° C. When 13.9 parts of ammonia had been absorbed, the mixture became thick and mechanical stirring was not feasible, and an additional amount of 3.2 parts of ammonia was then added below the surface of the mixture. Substantially monomeric acrylamide was recovered from the reaction mixture by vacuum distillation at 1 mm. mercury pressure yielding 46.4 parts of a white product melting at 79° to 85° C.

*Example 3*

The concentration of the reaction product of example 1 was adjusted through addition of water to yield an aqueous solution of acrylamide sulfate in a mole ratio of one molecular part acrylamide sulfate for each 4 molecular parts of water. To this solution was added solid sodium carbonate until the mixture was slightly alkaline, the amount of sodium carbonate utilized being 107 parts by weight sodium carbonate per 169.9 parts by weight (solids basis) acrylamide sulfate. During the addition of the sodium carbonate the temperature was maintained between 25° and 30° C., the temperature control being accomplished by controlling the rate of addition of sodium carbonate. In order to insure alkalinity of the reaction mixture, an additional 11 parts of sodium carbonate was added.

Fifty parts by volume of methanol was added to the neutralization mixture to yield a slurry of hydrated sodium sulfate crystals in an alcohol solution of acrylamide. The slurry was then filtered and the filter cake washed with additional parts of methanol. Acrylamide was then recovered by evaporation of the combined solutions at reduced pressure to yield 62.3 parts by weight of the crude product. One recrystallization from hot diethylene chloride gave 45.4 parts in the first crop of crystals, the compound melting at 82.6° to 84.2° C.

*Example 4*

One hundred thirty-seven and eight tenths parts of acrylamide sulfate was dissolved in 150 parts of methanol at 20° to 35° C. and ammonia was introduced above the surface of the well-stirred solution until 17.4 parts of ammonia had been absorbed. During the addition of the ammonia crystals of ammonium sulfate and ammonium bisulfate the resulting slurry was filtered and the crystals were washed with small additional amounts of methanol, the washing being combined with the main filtrate. The methanol was removed from the solution by evaporation under reduced pressure to leave substantially 100% yield of crude acrylamide.

In the hydrolysis reaction for converting the nitrile to amide sulfate, there is utilized as the hydrolyzing agent sulfuric acid monohydrate in slightly over equal molecular proportions with relation to the nitrile such as, for example, acrylonitrile and its α-methyl-, α-chloro-substituted derivatives. Thus, for each molecular part of the nitrile there is utilized slightly over one molecular part sulfuric acid, such as between about one and about two and preferably between about 1.1 and about 1.5 molecular parts and, likewise, slightly over one molecular part water, preferably about 1.1 to about 1.5 molecular parts.

This hydrolyzing reaction is carried out at a suitable temperature and for a suitable time to yield substantially complete hydrolysis to the amide sulfate. According to the preferred embodiment of the invention the hydrolysis reaction occurs at a temperature below about 100° C. and preferably at a temperature between about 40° and about 80° C. and generally between about 60° and 70° C. The time required for the reaction necessarily varies with the temperature of the reaction, being shorter for a higher temperature and longer for a lower temperature. However, when operating within the preferred temperature range, a reaction time of between about ½ hour and about five hours and usually about two hours will be found satisfactory. During the hydrolysis reaction period it is desirable to have present a suitable polymerization inhibitor. These inhibitors include, for example, an organic reducing agent such as, for example, hydroquinone or the like or, preferably, inorganic compounds such as cupric sulfate or the like which are readily compatible with the reaction mixture.

The product resulting from the hydrolyzing reaction is an aqueous solution or dispersion of the amide sulfate which is suitable for use as such, for example in further chemical reactions, or which may be readily transformed to an aqueous solution of the free amide, which aqueous solution is then adapted for use in polymerization reactions and the like. However, according to the preferred embodiment of this invention, the aqueous solution or dispersion of the amide sulfate is further treated to yield the substantially monomeric solid amide. In producing this substantially monomeric solid amide, the amide sulfate solution or dispersion may be treated as such or may, if desired, first be crystallized for the starting material of isolation procedures. Thus, as shown in the examples, acrylamide sulfate crystals may be recovered from the hydrolysis reaction mixture and utilized in substantially anhydrous condition or, alternatively, the concentrated acrylamide sulfate reaction mixture may be utilized directly. In either event, the amide sulfate is neutralized in the substantial absence of available water and the solid substantially monomeric amide is recovered from the neutralization mixture by physical separation such as filtration, centrifuging distillation, evaporation, and the like.

According to one embodiment of the invention, the substantially anhydrous amide sulfate is reacted with ammonia, preferably in the absence of solvent, and the solid monomeric amide is physically recovered from the ammonium sulfate salt of neutralization, preferably by crystallization, evaporation, or the like. When proceeding according to this embodiment of the invention, the amide sulfate, for example, acrylamide sulfate, preferably is heated above its melting point, for example to a temperature of about 55° to 70° C., and ammonia is added to the molten compound. The addition of ammonia is continued until the neutralization mixture is a semisolid mass because of the presence of large quantities of the neutralization salt, and the amide is then recovered. When proceeding according to this embodiment of the invention, there is utilized approximately a molecular equivalent of ammonia for each molecular part of amide sulfate.

According to another embodiment of the invention, the substantially monomeric amide is recovered from the amide sulfate in aqueous solution or dispersion by the addition thereto of an anhydrous neutralizing agent characterized by forming, upon neutralization of the amide sulfate, an inorganic sulfate which exists in the form of hydrated crystals. Thus, for example, there may be utilized solid sodium carbonate which yields as a neutralization salt, sodium sulfate decahydrate. When proceeding according to this embodiment of the invention the amide sulfate such as acrylamide sulfate is neutralized preferably at a relatively lower temperature such as below about 50° C. and preferably between about 20° and about 35° C. and in the presence of a controlled amount of water which is less than the amount to form the hydrated crystals of the neutralization salt. Thus, for example, there may be utilized acrylamide sulfate and solid sodium carbonate in the presence of a sufficient quantity of water to form an aqueous medium for the neutralization reaction but, at the same time, in an amount of water less than that amount necessary to form sodium sulfate decahydrate. According to preferred operating conditions, acrylamide sulfate in the presence of between about four and about five molecular parts water per molecular part acrylamide sulfate is neutralized by the addition thereto of solid substantially anhydrous sodium carbonate. Thus, there is present a sufficient quantity of water to form an aqueous alkaline solution with the sodium carbonate, yet leaving substantially no residual or available water after formation of sodium sulfate decahydrate, with the result that the acrylamide neutralization product may be physically separated from the water of crystallization. Thus, there is sufficient water to permit the neutralization reaction but at the same time there is a minimum of available water in the sense that there is no residual or excess water over and above the amount for the hydrated salt. The amide is recovered from the neutralization reaction mixture by suitable and convenient means such as, for example, dissolution in a nonaqueous solvent for the amide which is a nonsolvent for the hydrated inorganic neutralization salt, suitable solvents for this purpose being, for example, lower alcohols, ketones, or the like. The solution of the amide is then separated from the inorganic crystals, for example, by filtration, centrifuging, or the like, and the substantially monomeric solid amide is recovered from the solution by crystallization, evaporation, or other suitable separation methods.

According to another embodiment of the invention the substantially monomeric amide is isolated from the amide sulfate through substantially half neutralization of the salt with gaseous ammonia, preferably in the presence of a volatile organic solvent such as, for example, a lower alcohol, ketone, or the like. The resulting neutralization mixture is a slurry of ammonium bisulfate in the solvent solution of the amide, and the amide is recovered therefrom by physical separation such as filtration or the like followed by evaporation of the solvent.

In each of the methods for recovery of the substantially monomeric amide from the amide sulfate, the sulfate is neutralized with a suitable neutralization reagent in the substantial absence of available water to yield a substantially anhydrous acrylamide product from which the solid monomeric amide may readily be separated. In each of these procedures the use of available water and the use of polymerization promoting conditions is carefully avoided. Thus, in general, temperatures are maintained preferably below about 70° C. and, if a solvent be present, below about 50° C. and preferably between about 20° and about 35° C. When desired, a polymerization inhibitor may be included in the neutralization mixture; for example, frequently the polymerization inhibitor of the hydrolysis step of the process will be present during this step.

The product of the present invention is substantially monomeric acrylamide or its homolog, which is suitable for numerous uses such as further chemical reactions including, for example, polymerization and copolymerization reactions and the like and for other uses as are known in the art.

What I claim and desire to protect by Letters Patent is:

1. The process for recovering a monomeric amide from a sulfuric acid hydrolysis mixture containing predominantly a compound selected from the group consisting of acrylamide-, methacrylamide- and α-chloroacrylamide sulfate, which comprises forming a hydrate of sodium sulfate by neutralizing said mixture with substantially anhydrous sodium carbonate in the presence of a significant amount of water but less than that necessary to completely hydrate all the sodium sulfate formed during the neutralization reaction and isolating substantially monomeric amide therefrom.

2. The process for recovering a monomeric amide from a sulfuric acid hydrolysis mixture containing predominantly a compound selected from the group consisting of acrylamide-, methacrylamide- and α-chloroacrylamide sulfate, which comprises forming a hydrate of sodium sulfate by neutralizing said mixture with substantially anhydrous sodium carbonate in the presence of a significant amount of water but less than that necessary to completely hydrate all the sodium sulfate formed during the neutralization reaction, adding a volatile organic solvent for the amide to form a suspension, separating by filtration a solution of the amide from the solid, incompletely hydrated crystalline sulfate of neutralization, and recovering substantially monomeric amide from the solution by evaporation of the solvent.

3. The process for recovering a monomeric amide from a sulfuric acid hydrolysis mixture containing predominantly a compound selected from the group consisting of acrylamide-, methacrylamide- and α-chloroacrylamide sulfate, which comprises adjusting the concentration of the mixture to between about 4 and 5 molecular parts water per molecular part amide sulfate, forming a hydrate of sodium sulfate by neutralizing said mixture with substantially anhydrous sodium carbonate, and adding a volatile organic solvent for the amide to form a suspension, separating by filtration a solution of the amide from the solid, incompletely hydrated crystalline sulfate of neutralization, and recovering substantially monomeric amide from the solution by evaporation of the solvent.

4. The process for recovering monomeric acrylamide from a sulfuric acid-hydrolysis mixture containing predominantly acrylamide sulfate, which comprises adjusting the concentration of said mixture to between about 4 and 5 molecular parts water per molecular part of acrylamide sulfate, forming a hydrate of sodium sulfate by neutralizing said mixture with substantially anhydrous sodium carbonate, adding a volatile organic solvent for the amide to form a suspension, separating by filtration a solution of the amide from the solid, incompletely hydrated crystalline sulfate of neutralization, and recovering substantially monomeric amide from the solution by evaporation of the solvent.

References Cited in the file of this patent

UNITED STATES PATENTS

| Number | Name | Date |
|---|---|---|
| 1,581,621 | Trusler | Apr. 20, 1926 |
| 2,140,469 | Crawford et al. | Dec. 13, 1938 |
| 2,431,468 | Davis | Nov. 25, 1947 |
| 2,628,977 | Grigsby | Feb. 17, 1953 |

FOREIGN PATENTS

| Number | Country | Date |
|---|---|---|
| 200,363 | Switzerland | Dec. 16, 1938 |
| 884,564 | France | Apr. 27, 1943 |

OTHER REFERENCES

Bruylants et al., "Bull. de la classe de Sciences, Acad. Royale de Belgique" (series 5) vol. 13 (1927), pp. 767, 768, 779 to 781.